(No Model.)

H. JUDSON.
Screen Plate for Paper Making Machines.

No. 238,126.      Patented Feb. 22, 1881.

Witnesses:
P. C. Dieterich
Fred G. Dieterich

Inventor
Howard Judson
Per C. H. Watson & Co. Attorneys.

UNITED STATES PATENT OFFICE.

HOWARD JUDSON, OF NEWARK, NEW JERSEY.

SCREEN-PLATE FOR PAPER-MAKING MACHINES.

SPECIFICATION forming part of Letters Patent No. 238,126, dated February 22, 1881.

Application filed January 28, 1881. (No model.)

*To all whom it may concern:*

Be it known that I, HOWARD JUDSON, a citizen of the United States, and resident of Newark, in the county of Essex and State of New Jersey, have invented certain new and useful Improvements in Screen-Plates for Paper-Making Machines; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to screen-plates for paper-making machines; and it consists in forming such plates with alternately-arranged slots, as hereinafter more fully described.

Figure 1:
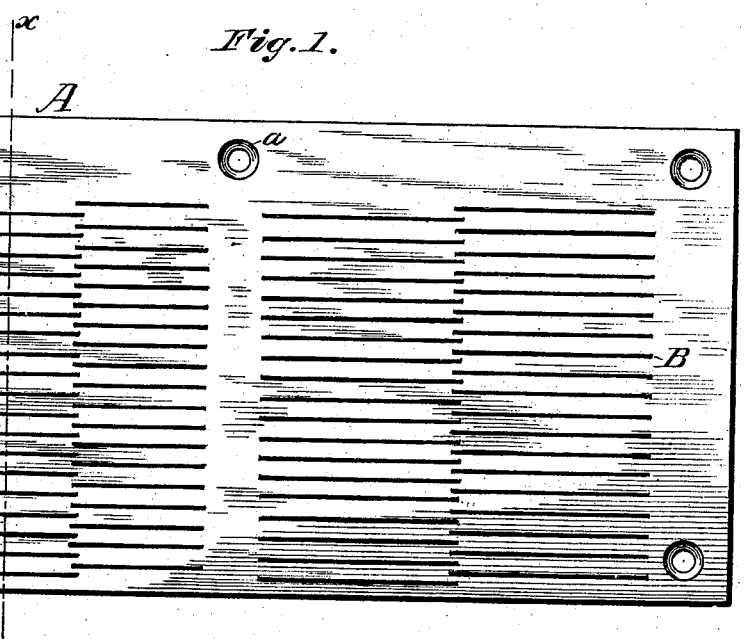
Figure 2:
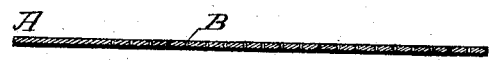

In the annexed drawings, Figure 1 represents a plan view of my improved screen-plate, and Fig. 2 is a section on the line *x x*.

The plate A, which usually is made of brass, may be of any suitable thickness, and is provided with screw-holes *a*, by which it is secured to the frame of the machine.

B represents the slots that are cut into the plate from the back in the ordinary manner, but are so arranged that the ends of the slots in each series alternate with the ends of those in the next series. These slots may be of any convenient length, but are preferably made shorter than those heretofore employed, for the purpose of obviating lateral spring of the uncut portions of the plate remaining between the slots.

By arranging the slots B in series in such a manner that the ends of the slots in each series alternate with the ends of those in the adjoining series, I am enabled to cut the slots so that the ends of those in adjoining series will overlap each other, thus dispensing with the rib or bar of uncut material which has been heretofore left between the ends of the series. In this manner the plate is much strengthened, there being no weak points exposed to strain or fracture, and the plate may be made of diminished thickness and used successfully without the necessity of employing any other support than that afforded by the frame of the machine. This mode of construction also furnishes a much larger screening-surface and involves less than ordinary expense.

Having thus described my invention, what I claim as new, and desire to secure by Letters Patent, is—

1. The herein-described method of arranging the slots of a screen-plate so that the ends of the slots in each series will alternate with and overlap the ends of those in the adjoining series, substantially as specified.

2. As a new article of manufacture, a screen-plate for paper-making machines, provided with slots arranged in series, so that the ends of the slots in one series will alternate with and overlap the ends of those in the adjoining series, substantially as shown and described.

In testimony that I claim the foregoing as my own I have hereto affixed my signature in presence of two witnesses.

HOWARD JUDSON.

Witnesses:
PHILIP MAURO,
A. R. BROWN.